(12) United States Patent
Wang (10) Patent No.: US 12,214,652 B2
(45) Date of Patent: Feb. 4, 2025

(54) ALL-TERRAIN VEHICLE

(71) Applicant: SEGWAY TECHNOLOGY CO., LTD., Changzhou (CN)

(72) Inventor: Mingyong Wang, Changzhou (CN)

(73) Assignee: Segway Technology Co., Ltd., Jiangsu (CN)

( * ) Notice: Subject to any disclaimer, the term of this patent is extended or adjusted under 35 U.S.C. 154(b) by 434 days.

(21) Appl. No.: 17/697,429

(22) Filed: Mar. 17, 2022

(65) Prior Publication Data

US 2022/0297531 A1    Sep. 22, 2022

(30) Foreign Application Priority Data

Mar. 18, 2021 (CN) .......................... 202110292058.8
Mar. 18, 2021 (CN) .......................... 202120560635.2
Mar. 18, 2021 (CN) .......................... 202120561081.8
Mar. 18, 2021 (CN) .......................... 202120563814.1

(51) Int. Cl.
*B60K 11/04* (2006.01)
*B60K 13/02* (2006.01)
*B62D 21/18* (2006.01)

(52) U.S. Cl.
CPC .............. *B60K 11/04* (2013.01); *B60K 13/02* (2013.01); *B62D 21/183* (2013.01); *B60Y 2200/124* (2013.01)

(58) Field of Classification Search
CPC ...... B60K 11/04; B60K 13/02; B62D 21/183; B60Y 2200/124
See application file for complete search history.

(56) References Cited

U.S. PATENT DOCUMENTS

| | | | | |
|---|---|---|---|---|
| 3,334,702 A | * | 8/1967 | Granryd | E02F 3/84 180/243 |
| 3,451,494 A | * | 6/1969 | Kowalik | B62D 55/0655 180/14.1 |
| 6,109,217 A | * | 8/2000 | Hedlund | F28D 1/03 123/41.51 |
| 6,422,182 B1 | * | 7/2002 | Ohta | B60K 11/04 165/44 |
| 6,910,529 B2 | * | 6/2005 | Stone | F01P 3/18 123/41.49 |

(Continued)

FOREIGN PATENT DOCUMENTS

| CN | 201176124 Y | 1/2009 |
|---|---|---|
| CN | 209369916 U | 9/2019 |

(Continued)

OTHER PUBLICATIONS

The State Intellectual Property Office of People's Republic of China, First Office Action for CN application 202110292058.8 with English translation.

*Primary Examiner* — Jacob B Meyer
(74) *Attorney, Agent, or Firm* — Harter Secrest & Emery LLP; Timothy W. Menasco, Esq.

(57) ABSTRACT

The present disclosure discloses an all-terrain vehicle, and the all-terrain vehicle includes: a frame; a driver's cab arranged on the frame and located in a middle portion of the frame; a container arranged on the frame and located behind the driver's cab; a power unit arranged on the frame; a second radiator arranged behind the driver's cab, the container being defined with a second air port corresponding to the second radiator.

18 Claims, 8 Drawing Sheets

(56) References Cited

U.S. PATENT DOCUMENTS

| | | | |
|---|---|---|---|
| 7,455,136 B2* | 11/2008 | Pleune | B60K 11/04 |
| | | | 165/41 |
| 9,533,551 B2* | 1/2017 | Cheng | B60H 1/2221 |
| 9,566,858 B2* | 2/2017 | Hicke | B60K 13/02 |
| 10,202,151 B1* | 2/2019 | Nakamura | B62D 25/12 |
| 10,369,861 B2* | 8/2019 | Deckard | B62D 33/0625 |
| 10,569,642 B2* | 2/2020 | Borud | B60K 11/06 |
| 10,981,448 B2* | 4/2021 | Safranski | B60K 17/348 |
| 11,384,680 B2* | 7/2022 | Brahmasani | B60K 11/06 |
| 11,932,310 B2* | 3/2024 | Wang | B62D 25/12 |
| 2004/0124028 A1 | 7/2004 | Lachapelle | |
| 2012/0152631 A1* | 6/2012 | Oriet | B60W 10/02 |
| | | | 477/6 |
| 2013/0153180 A1* | 6/2013 | Montocchio | B60K 11/04 |
| | | | 165/121 |
| 2021/0221219 A1* | 7/2021 | Watanabe | B60K 11/085 |
| 2022/0297531 A1* | 9/2022 | Wang | B60K 11/04 |
| 2023/0182562 A1* | 6/2023 | Chen | B60K 7/0007 |
| | | | 180/68.4 |

FOREIGN PATENT DOCUMENTS

| | | | | |
|---|---|---|---|---|
| CN | 210309907 U | | 4/2020 | |
| CN | 210317533 U | | 4/2020 | |
| DE | 102022001762 A1 * | | 7/2022 | |
| FR | 3076605 B1 * | | 5/2020 | B60K 11/04 |
| FR | 3093303 A1 * | | 9/2020 | |
| WO | WO-2023016846 A1 * | | 2/2023 | B60K 11/04 |

* cited by examiner

ALL-TERRAIN VEHICLE

CROSS-REFERENCE TO RELATED APPLICATION

The present disclosure is based on and claims priorities to Chinese Patent Application Serial No. 202110292058.8, 202120563814.1, 202120561081.8 and 202120560635.2, filed on Mar. 18, 2021, the entire content of which are incorporated herein by reference.

FIELD

The present disclosure relates to a field of vehicle technologies, and more particularly to an all-terrain vehicle.

BACKGROUND

With development of science and technology, all-terrain vehicle has been recognized by people for its good trafficability and outstanding driving pleasure, and is gradually entering people's life.

In a related art, a front side of a container of the all-terrain vehicle is provided with components that work together with a power unit. Due to poor ventilation effect at the front side of the container, heat generated by the components that are located the front side of the container and work with the power unit during operation cannot be quickly and effectively discharged to a rear side of the container, which may reduce working performance of the components at the front side of the container, and further reduce performance of the all-terrain vehicle.

In addition, in all-terrain vehicles of the related art, the power unit is usually arranged at a rear side of a driver's cab, and most components working together with the power unit are also arranged at the rear side of the driver's cab. Ventilation effect of the rear side of the driver's cab is relatively poor compared with that of the front side of the driver's cab, which affects work of the power unit to a certain extent, resulting in the performance of all-terrain vehicles being affected.

Moreover, a radiator of the all-terrain vehicle is generally arranged at a front side of a vehicle body to cool off an engine. However, in the case of insufficient air intake at the front side of the vehicle body, the radiator cannot effectively discharge heat for the engine of the all-terrain vehicle, which may lead to an excessive temperature of the engine, and cause damage or spontaneous combustion.

SUMMARY

The present disclosure aims to solve at least one of the technical problems existing in the related art.

To this end, according to a first aspect of the present disclosure, an all-terrain vehicle is provided and includes a frame; a driver's cab arranged on the frame and located in a middle portion of the frame; a container arranged on the frame and located behind the driver's cab; a power unit arranged on the frame; a second radiator arranged behind the driver's cab, the container being defined with a second air port corresponding to the second radiator.

According to a second aspect of the present disclosure, an all-terrain vehicle is provided and includes a frame; a driver's cab arranged on the frame; a power unit arranged on the frame, a cooling channel being defined in the power unit, the power unit comprising an engine, an air inlet pipeline and an air filter, the air inlet pipeline being connected between the engine and the air filter; a container arranged on the frame and located behind the driver's cab; a second radiator located between the container and the driver's cab and communicated with the cooling channel.

According to a third aspect of the present disclosure, an all-terrain vehicle is provided and includes a frame; a driver's cab arranged on the frame; a power unit arranged on the frame, a cooling channel being defined in the power unit; a first radiator arranged on the frame and located in front of the driver's cab, and communicated with the cooling channel; a second radiator arranged on the frame and located behind the driver's cab, and communicated with the cooling channel.

Additional aspects and advantages of the present disclosure will be given in part in the following description, become apparent in part from the following description, or be learned from the practice of the present disclosure.

BRIEF DESCRIPTION OF THE DRAWINGS

The above and/or additional aspects and advantages of the present disclosure will become apparent and easy to understand from following descriptions of embodiments in combination with accompanying drawings, in which.

DETAILED DESCRIPTION

Embodiments of the present disclosure are described in detail below. The embodiments described with reference to accompanying drawings are exemplary. The embodiments of the present disclosure are described in detail below.

An all-terrain vehicle 1000 according to an embodiment of the present disclosure is described below with reference to FIGS. 1 to 7.

As shown in FIG. 1-FIG. 7, the all-terrain vehicle 1000 according to the embodiment of the present disclosure includes: a frame 10, a driver's cab 20, a container 30, a power unit 50 and a second radiator 72, the driver's cab 20 is arranged on the frame 10 and located in a middle portion of the frame 10, the container 30 is arranged on the frame 10 and located behind the driver's cab 20, and the container is mainly configured to place some goods and tools to facilitate users to transport and travel. The power unit 50 is also arranged on the frame 10 to provide power for the all-terrain vehicle 1000, which not only improves the stability and firmness of the mounting of the driver's cab 20, the container 30 and the power unit 50 on the all-terrain vehicle 1000, but also enables the driver's cab 20 and the container 30 to be arranged at front-rear intervals. Furthermore, a space between the driver's cab 20 and the container 30 may be used to arrange components, such that a structural layout of the all-terrain vehicle 1000 is more reasonable.

Further, as shown in FIG. 2-FIG. 5, the second radiator 72 is arranged behind the driver's cab 20, a front side of the container 30 is defined with a second air port 324 directly opposite to the second radiator 72. Specifically, the container 30 and the driver's cab 20 are arranged at front-rear intervals, the second radiator 72 is arranged between the driver's cab 20 and the container 30, i.e., behind the driver's cab 20 and in front of the container 30. The second radiator 72 may be communicated with the cooling channel in the power unit 50, so as to dissipate heat from the power unit 50. After the second radiator 72 dissipates the heat from the power unit 50, a temperature of the second radiator 72 rises, and the second radiator 72 needs to exchange heat with surrounding air, so as to reduce its own temperature and maintain the temperature within a suitable range. After the second radiator 72 exchanges heat with the surrounding air, the temperature of the air around the second radiator 72 rises, such that the second air port 324 defined on the container 32 and corresponding to the second radiator 72 may discharge hot air around the second radiator 92 from a front side of the container 30 to a rear side of the container 32. Thus, the air around the second radiator 72 may continuously flow and circulate, the temperature of the air around the second radiator 72 may be maintained in a normal range, so as to further ensure the second radiator 72 to dissipate heat for the power unit 50 of the all-terrain vehicle 1000 continuously and stably, thereby improving the reliability of the all-terrain vehicle 1000. In addition, the second air port 324 so arranged may also effectively prevent the air around the second radiator 72 from entering the driver's cab 20 forward and affecting drivers and passengers.

Further, as shown in FIG. 1-FIG. 6, during normal driving of the all-terrain vehicle 1000, air around the all-terrain vehicle 1000 may accelerate to flow toward the rear side of the container 30, so as to accelerate flow rate of the air flowing to the rear side of the container 30 through the second air port 324, which may increase an air volume of the air flowing to the rear side of the container 30 in per unit time. With such the arrangement, the second radiator 72 may effectively utilize the air during the driving of the all-terrain vehicle 1000, such that the heat may be carried away by the fast flowing air, which may further improve the heat dissipation efficiency and ensure the working reliability of the second radiator 72. In addition, the second air port 324 at the front side of the container 30 may also be configured to ventilate the goods in the container 30, which may prevent the acceleration of damage caused by a long-term stuffiness of the goods in the container 30.

Thus, by the second air port 324 defined on the container 30, the air exchanged with the second radiator 72 may be quickly discharged from the second air port 324, which may improve heat dissipation effect of the second radiator 72, so as to ensure performance of the all-terrain vehicle 1000.

The driver's cab 20 may also be provided with a port for ventilation at a position corresponding to a position of the second air port 324, which may reduce an air resistance, such that the air may quickly take away the heat around the second radiator 72 and other components in a front-rear direction.

As shown in FIGS. 2-6, the container 30 may mainly include: a container body 31 and a front cover plate 32. A front side of the container body 31 is defined with a through hole 312, the front cover plate 32 is detachably mounted at the through hole 312, and the front cover plate 32 is defined with the second air port 324. Specifically, the container body 31 may be configured to load goods and separate the goods from components at the front side of the container body 31 as well as the drivers and passengers. In this way, the components at the front side of the container body 31 as well as the drivers and passengers may be prevented from being affected by the goods, so as to effectively protect safety of the components at the front side of the container body 31 as well as the drivers and passengers.

Further, the front side of the container body 31 is defined with the through hole 312, such that the front cover plate 32 is detachably mounted at the through hole 312, which not only ensures the stability and firmness of the mounting of the front cover plate 32 on the container body 31, but also facilitates user to open the front cover plate 32 and repair the second radiator 72 through the through hole 312. Moreover, the arrangement may further prevent that the front cover plate 32 protrudes relative to the container body 31 and affects the loading of goods in the container 30.

In addition, the second air port 324 is defined on the front cover plate 32, air of the front side of the container 30 may be discharged directly through the second air port 324 on the front cover plate 32. In this way, in a process of being discharged from the front side of the container 30, the air may travel a short distance without causing obstacle to other components, so as to ensure a speed of the air flowing out of the second air port 324, and further improve the heat dissipation effect of the second radiator 72 on the power unit 50. In addition, through the arrangement that the second air port 324 is defined on the front cover plate 32, the front cover plate 32 may be manufactured separately without directly arranging the second air port 324 on the container body 31. In addition, the second air port 324 is configured as a honeycomb air port or grid air port, such that on the premise of ensuring the ventilation performance of the second air port 324, relatively large foreign matters may be prevented from entering the accommodating slot 23 of the driver's cab 20 through the second air port 324 and damaging the second radiator 72, which may further ensure the structural reliability of the second radiator 72.

As shown in FIG. 2-FIG. 6, the front cover plate 32 is provided with a second air guide strip 323 for air guide at the second air port 324. Specifically, the second air guide strip 323 may guide the air on the front side of the container 30, which may not only further improve the speed of the air discharged from the second air port 324, but also prevent the air from spreading around after being discharged from the second air port 324, resulting in the air returning to the front side of the container 30. In this way, effect of the air discharged from the second air port 324 may be further improved, and thus, the reliability of the second radiator 72 may be further improved. In addition, the arrangement of the second air guide strip 323 may also strengthen structural strength of the second air port 324 and avoid the structure of the second air port 324 being too fragile to be damaged.

As shown in FIG. 2-FIG. 6, an upper end of the second air guide strip 323 is bent forward and bent into an arc shape. Specifically, the upper end of the second air guide strip 323 is bent forward, such that the upper end of the second air guide strip 323 have a certain air guide length, so as to ensure that the air is stably and continuously discharged from the front side of the container 30 to the rear side of the container 30 through the second air port 324, further prevent the air from returning to the front side of the container 30, and ensure the reliability of the second air port 324. Thus, the heat dissipation effect of the second radiator 72 may be ensured.

Further, the upper end of the second air guide strip 323 is bent forward into the arc shape, the air may flow in accordance with an arc-shaped bent portion at the upper end of the second air guide strip 323. Thus, not only can the flow of air be much smoother to prevent the flow of air from getting stuck, but also can prevent the air from making noise at the bent portion, which may further reduce vehicle noise of the all-terrain vehicle 1000.

As shown in FIG. 2-FIG. 6, the front cover plate 32 is provided with a third flange 325 at an edge of the second air port 324, and the third flange 325 is in annular shape. The third flange 325 may cover the edge of the second air port 324, which may prevent foreign matters from entering the second air port 324 to a certain extent, and the arrangement of the third flange 325 may effectively strengthen structural strength of the edge of the second air port 324, so as to prevent serious deformation of the second air port 324 during very high winds, thereby improving structural reliability of the container 30.

As shown in FIG. 2-FIG. 6, a front side wall 311 of the container body 31 is provided with a first hanging portion 3112, the front cover plate 32 is provided with a second hanging portion 326, one of the first hanging portion 3112 and the second hanging portion 326 is a hook, and the other one of the first hanging portion 3112 and the second hanging portion 326 is a hanging hole, and the hook is fitted with the hanging hole in a hanging manner. Specifically, through the fitting between the hook and the hanging hole, the front cover plate 32 may be mounted and arranged on the front side wall 311 of the container body 31. In this way, on the premise of ensuring the stability and firmness of the mounting of the front cover plate 32 on the front side wall 311 of the container body 31, a difficulty that the front cover plate 32 is mounted and arranged on the front side wall 311 of the container body 31 may be reduced, so as to facilitate the mounting of the front cover plate 32, and it is also convenient to remove the front cover plate 32 from the front side wall 311 of the container body 31.

As shown in FIG. 2-FIG. 6, the front cover plate 32 may mainly include: a cover body 321 and a second flange 322, the second flange 322 is connected to a top of the cover body 321, the second flange 322 is arranged on a top of the front side wall 311 of the container body 31, the front side wall 311 of the container body 31 is provided with a first positioning portion 3111, and the second flange 322 is provided with a second positioning portion 3221. One of the first positioning portion 3111 and the second positioning portion 3221 is a positioning column, the other one of the first positioning portion 3111 and the second positioning portion 3221 is a positioning hole, the positioning column is positioned and fitted with the positioning hole. Specifically, the positioning column is placed into the positioning hole for positioning and fitting, the second flange 322 may be quickly and accurately mounted and arranged to the top of the front side wall 311 of the container body 31, such that on the basis of the fitting between the first hanging portion 3112 and the second hanging portion 326, the stability and firmness of the mounting of the front cover plate 32 on the container body 31 may be further improved.

In addition, the second flange 322 on the top of the cover body 321 is arranged on the top of the front side wall 311 of the container body 31, which may cover and seal a top of a through hole 312 defined on the front side of the container body 31, so as to prevent external foreign matters from entering the through hole 312 through the top of the through hole 312 and damaging corresponding components in the through hole 312 to a certain extent, and further improve the reliability of the container 30.

As shown in FIG. 2-FIG. 6, the front cover plate 32 is provided with reinforcing ribs 3241 on a periphery of the second air port 324. In this way, on the premise of ensuring ventilation of the front cover plate 32 and preventing the reinforcing ribs 3241 from covering the second air port 324, the structural strength of the front cover plate 32 may be further enhanced, so as to further prevent the front cover plate 32 from being easily damaged by external forces. Thus, the structural reliability of the container 30 of the all-terrain vehicle 1000 may be improved.

As shown in FIG. 2-FIG. 6, the container body 31 is provided with a step portion 313 recessed at an edge of the through hole 312, an edge of the front cover plate 32 is overlapped at the step portion 313, and a surface of the front cover plate 32 does not exceed a surface of the front side wall 311 of the container body 31. Specifically, the arrangement that the container body 31 is provided with the step portion 313 recessed at an edge of the through hole 312, such that the surface of the front cover plate 32 overlapped at the step portion 313 does not exceed the surface of the front side wall 311 of the container body 31. Through such an arrangement, not only the stability and firmness of the mounting of the front cover plate 32 on the container body 31 may be improved, but also the surface of the front cover plate 32 is prevented from protruding relative to the surface of the front side wall 311 of the container body 31, which may otherwise cause the surface of the front cover plate 32 vulnerable to scratch and impact and results in the damage of the front cover plate 32. In this way, the structural reliability of the front cover plate 32 may be further improved.

In addition, the container 30 may also be provided with a baffle, which may function to cover the second air port 324. For example, when the container 30 is loaded with sand, soil, water and other goods, the baffle may cover the front cover plate 32.

Moreover, the second air guide strip 323 at the front cover plate 32 may be arranged as a movable second air guide strip 323. When the container 30 is loaded with sand, soil, water and other goods, the second air guide strip 323 may be rotated to a vertical position so as to close the second air port 324. When the container 30 is loaded with other goods, the second air guide strip 323 may be rotated to a horizontal position or an inclined position at an acute angle relative to the horizontal position.

Optionally, as shown in FIG. 1-FIG. 6, the second radiator 72 is located at a front side of the container 30, and a leeward surface of the second radiator 72 is opposite to the second air port 324. Through such an arrangement, the second radiator 72 may make full use of the air blowing to the second radiator 72 during the driving of the all-terrain vehicle 1000 for heat exchange, and the second radiator 72 may make full use of a spacing area between the front side of the container 30 and the driver's cab 20, thereby preventing the arrangement of the second radiator 72 from affecting the arrangement of other components, which may improve space utilization of the all-terrain vehicle 1000.

Optionally, the second radiator 72 is arranged in the container 30, such that the second radiator 72 correspond to the second air port 324 defined on the container 30. During the driving of the all-terrain vehicle 1000, the second radiator 72 may also fully exchange heat with the air blowing to the second radiator 72. On this premise, the stability of the mounting of the second radiator 72 may be improved, and the container 30 may also further seal and protect the second radiator 72 to prevent the second radiator 72 from being exposed to the outside, which may otherwise cause damage due to erosion of external foreign bodies and the impact of external forces. In this way, the structural reliability of the second radiator 72 may be improved and the service life of the second radiator 72 may be prolonged.

Further, the second radiator 72 may be selectively arranged in the front side of the container 30 or inside the container 30 according to a size of the second radiator 72, an overall structural layout of the all-terrain vehicle 1000 and specific process requirements, so as to improve the applicability of the second radiator 72.

In some embodiments, the power unit 50 generates heat inside during working. In order to ensure that a working temperature of the power unit 50 may be maintained within a reasonable range, a cooling channel is defined in the power unit 50. The power unit 50 includes an engine, an air inlet pipeline and an air filter. The air inlet pipeline is connected between the engine and the air filter, the air filter may filter air, and the air then enters a cylinder of the engine through the air inlet pipe. A liquid medium configured for cooling may flow in the cooling channel. When flowing in the cooling channel, the liquid medium may exchange heat with the power unit 50, so as to take heat of the power unit 50 away, and then the working temperature of the power unit 50 may be maintained within a reasonable range.

The second radiator 72 is communicated with the cooling channel of the power unit 50. That is, a circulation circuit may be formed between a heat dissipation channel inside the second radiator 72 and the cooling channel of the power unit 50, and the liquid medium may circulate in the circulation circuit. The circulation circuit may also be provided with a water pump to provide power for circulation of liquid medium, and the water pump may be connected with the power unit 50 in a transmission manner, that is, the power unit 50 may drive the water pump to work simultaneously during working, so as to ensure that the liquid medium may participate in the heat exchange when the power unit 50 starts to work.

When the power unit 50 works at high power, the power unit 50 generates a large amount of heat, and the liquid medium may dissipate the heat in the heat dissipation channel inside the second radiator 72. After the temperature is reduced, the liquid medium enters the cooling channel again to exchange heat with the power unit 50, such that the heat of the power unit 50 may be effectively and continuously carried away.

Of course, during a cold-start of the power unit 50, the liquid medium in the cooling channel may also quickly return to the cooling channel without passing through the heat dissipation channel, such that the temperature of the power unit 50 may rise rapidly within a reasonable range.

As shown in FIGS. 2-5, the second radiator 72 is located between the container 30 and the driver's cab 20. Specifically, the container 30 is arranged behind the driver's cab 20, and there is a spacing area between the container 30 and the driver's cab 20. The second radiator 72 is arranged in the spacing area between the container 30 and the driver's cab 20, such that the spacing area between the container 30 and the driver's cab 20 may be reasonably utilized to distinguish the vehicle from the all-terrain vehicle with only a first radiator 71. In this way, a plurality of mounting positions of the radiators may be provided, so as to improve layout flexibility of the all-terrain vehicle 1000, and ensure the stability of the mounting position of the radiator.

Figure 1:
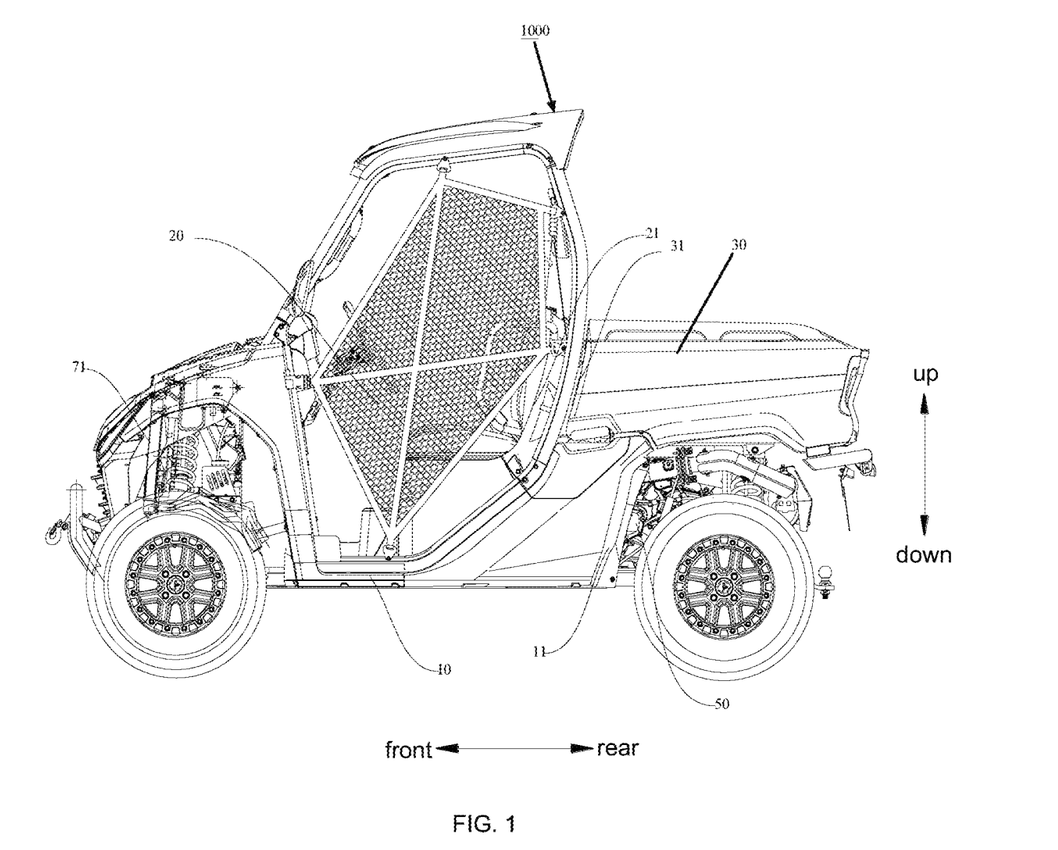
FIG. 1 is a schematic view of an all-terrain vehicle according to an embodiment of the present disclosure.

In addition, as shown in FIG. 1, the all-terrain vehicle 1000 may also be provided with a first radiator 71 on a front side of the frame 10 to dissipate heat of the power unit 50, and that is, the all-terrain vehicle 1000 may be further provided with the second radiator 72 between the container 30 and the driver's cab 20 on the basis of the original first radiator 71, which may further improve heat dissipation effect of the power unit 50, and thus improve the reliability of the power unit 50 and the all-terrain vehicle 1000. The first radiator 71 may be acted as a main radiator, the second radiator 72 arranged between the container 30 and the driver's cab 20 may be an auxiliary radiator, and the main radiator and the auxiliary radiator may work simultaneously, such that the temperature of the power unit 50 may be reduced more quickly. Of course, when the main radiator may meet heat dissipation demand of the power unit 50, the auxiliary radiator may be in a shutdown state. The main radiator and the auxiliary radiator may be connected in series or in parallel.

In some embodiments, as shown in FIG. 1-FIG. 6, the driver's cab 20 may mainly include: a backplate 21 located at a rear of the driver's cab 20 to separate the drivers and passengers in the driver's cab from components at rear side of the all-terrain vehicle 1000, thereby preventing the drivers and passengers from being affected by the working of the components at rear side, and effectively protecting the safety of the drivers and passengers.

The backplate 21 is connected to the front side of the container 30, an accommodating slot 23 is defined between the backplate 21 and the container 30, and the second radiator 72 is arranged in the accommodating slot 23. Specifically, the backplate 21 may be configured to mount seats. There may be two seats, i.e., a main driver's seat and a co-driver's seat. The backplate 21 is connected with the front side of the container 30 to define the accommodating slot 23, and the second radiator 72 is arranged in the accommodating slot 23, which may improve the stability and reliability of the mounting of the second radiator 72 in the all-terrain vehicle 1000. A part of the frame 10 may be located in the accommodating slot 23, such that the second radiator 72 may be mounted on this part of the frame 10, so as to solve the mounting problem of the second radiator 72.

In addition, the second radiator 72 is arranged in the accommodation slot 23, such that not only may the second radiator 72 be stably and firmly arranged in the accommodating slot 23, but also the accommodating slot 23 may better protect the second radiator 72, which may prevent large foreign matters from impacting the second radiator 72 through the backplate 21 and the container 30, and further improve the structural reliability of the second radiator 72. In addition, the accommodating slot 23 defined by the backplate 21 and the container 30 opens downward. The accommodating slot 23 opened downward may ensure its own ventilation, so as to improve exchange speed between the air around the second radiator 72 and the air outside the accommodating slot 23, and thus further improve the heat exchange efficiency between the second radiator 72 and the surrounding air.

In addition, the arrangement of the backplate 21 may separate the second radiator 72 from the drivers and passengers in the driver's cab 20, prevent the second radiator 72 from being hit or squeezed the personnel in the driver's cab 20 when the all-terrain vehicle 1000 is driving violently on a bumpy road, and further improve the reliability of the all-terrain vehicle 1000, thereby ensuring safety and driving experience of the personnel in the driver's cab 20.

In addition, when the second radiator 72 is dissipating heat, the air after heat exchange is emitted to the surroundings. The arrangement of the backplate 21 may prevent most of the air from being emitted forward, so as to effectively prevent the heat from being transferred to the drivers and passengers, and thus ensure driving comfort of the drivers and passengers. When the all-terrain vehicle 1000 is a driving state, the airflow flows from front to rear relative to the all-terrain vehicle 1000, thereby allowing the heat to be carried backwards.

As shown in FIG. 2-FIG. 6, a top of the backplate 21 is provided with a first flange 28, the first flange 28 is overlapped on a front side of the container 30, and the first flange 28 may be detachably connected to the container 30. Specifically, through the arrangement of the first flange 28 provided on the top of the backplate 21, a top of the accommodating slot 23, defined by the backplate 21 and the front side of the container 30, is sealed to relatively close the accommodating slot 23, such that the accommodating slot 23 may protect the second radiator 72, such that the external foreign matters are prevent from contacting the second radiator 72 and damaging the second radiator 72, and the second radiator 72 may be prevented from being damaged by external force hitting or squeezed, which may effectively improve the structural reliability and stability of the second radiator 72. In addition, the second radiator 72 is arranged in the accommodating slot 23 that is relatively sealed, so as to ensure the stability and firmness of the mounting of the second radiator 72, and prevent the second radiator 72 from separating from the all-terrain vehicle 1000 and being thrown out from the all-terrain vehicle 1000 when the all-terrain vehicle 1000 is driving violently on a bumpy road, and thus further ensure the structural reliability of the second radiator 72.

In addition, the second radiator 72 is substantially arranged vertically, and the first flange 28 is overlapped with the front side of the container 30 above the second radiator 72 without affecting the heat dissipation of the second radiator 72.

Further, the detachable connection of the first flange 28 relative to the container 30 may not only facilitate the connection of the first flange 28 with the container 30, but also facilitate the removal of the first flange 28 relative to the container 30. Thus, the user may easily open the accommodating slot 23 to repair and replace the second radiator 72 in the accommodating slot 23, which may improve user experience.

The detachable connection mode may be a fixed connection mode through fasteners, and the fasteners may be taken out for removal as needed. The fasteners may be bolts, etc. The detachable connection mode may also be a fixed connection through a snap structure. For example, the first flange 28 may be provided with a snap, a front side of the container 30 may be defined with a snap groove, and the snap is snapped in the snap groove. Of course, the detachable connection mode may also be a combination of the above two connection modes.

As shown in FIG. 1-FIG. 6, the driver's cab 20 may mainly include: a backplate 21 located at a front side of the second radiator 72, the backplate 21 is defined with a first air port 240, and the first air port 240 is directly opposite to the second radiator 72. Specifically, through the arrangement that the first air port 240 is defined on the backplate 21 and the first air port 240 is directly opposite a rear side of the second radiator 72, an air in the accommodating slot 23 may be exchanged with the outside through the first air port 240, which may further ensure fluidity of the air in the accommodating slot 23, further prevent the air in the accommodating slot 23 from being relatively high, which then affects the heat dissipation effect of the second radiator 72 in the accommodating slot 23. Further, the first air port 240 is directly opposite to the second radiator 72, such that a high-temperature air passing through the second radiator 72 may flow out directly from the first air port 240, thereby improving an exchange efficiency between the air in the accommodating slot 23 and the outside air, and further improving the heat dissipation effect of the second radiator 72.

Figure 2:
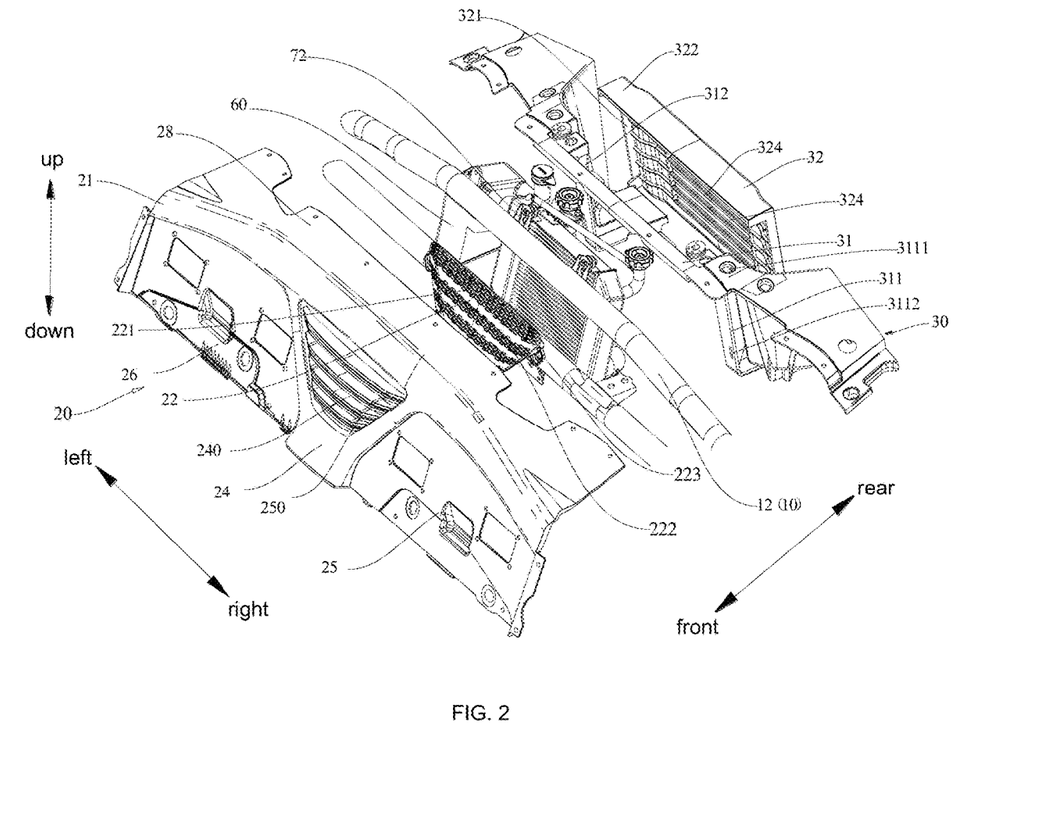
FIG. 2 is a partially exploded view of an all-terrain vehicle according to an embodiment of the present disclosure.
Figure 3:
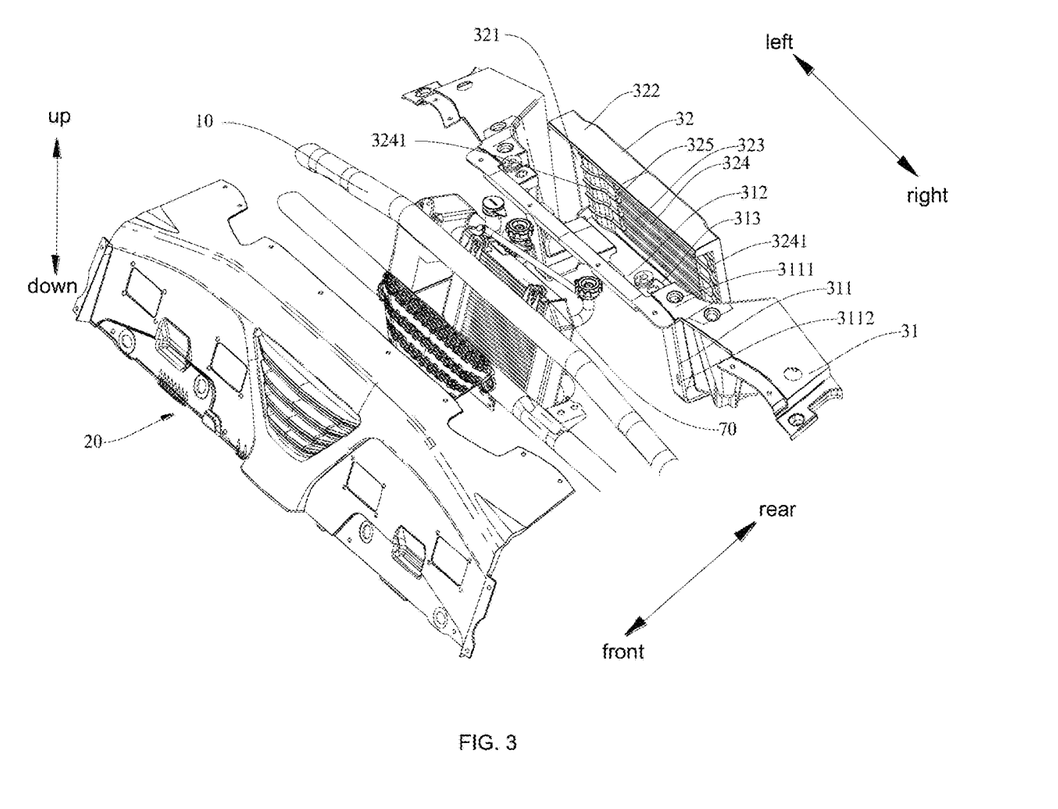
FIG. 3 is a partially exploded view of an all-terrain vehicle according to an embodiment of the present disclosure.

As shown in FIG. 2 and FIG. 3, the backplate 21 is provided with a main-seat region 25, a spacing region 24 and an auxiliary-seat region 26 in a transverse direction of the all-terrain vehicle 1000, and the first air port 240 is located in the spacing region 24 to supply air for the components at a rear side the backplate 21. Specifically, during the normal driving of the all-terrain vehicle 1000, there are drivers and passengers on the main-seat region 25 and auxiliary-seat region 26 of the backplate 21, respectively, that is, front sides of the main-seat region 25 and the auxiliary-seat region 26 on the backplate 21 are covered by the drivers and passengers. The spacing region 24 is provided on a spacing area between the main-seat region 25 and the auxiliary-seat region 26 of the backplate 21, and the first air port 240 is defined on the spacing region 24, so as to make full use of an available space on the backplate 21 and improve space utilization of the driver's cab 20. Moreover, even if the drivers and passengers cover the main-seat region 25 and the auxiliary-seat region 26 of the backplate 21, the air supplied to the components at the rear side the backplate 21 by the first air port 240 cannot be affected. In this way, the air volume supplied to the rear side of the backplate 21 through the first air port may be ensured, such that the first air port 240 may be more reliable, the structural arrangement of the all-terrain vehicle 1000 may be more reasonable, and the structural design of the all-terrain vehicle 1000 may be optimized. In order to meet driving regulations in different countries, positions of the main-seat region 25 and the auxiliary-seat region 26 may be interchanged.

In addition, during the normal driving of the all-terrain vehicle 1000, the air around the all-terrain vehicle 1000 accelerates to flow to the rear side of the driver's cab 20, so as to accelerate flow rate of the air flowing to the components at the rear side the backplate 21 through the first air port 240, which may increase the air volume of the air flowing to the components at the rear side of the backplate 21 in per unit time. The components at the rear side of the backplate 21 may include: a power unit, an exhaust pipe, a second radiator and the like. In this way, the components may effectively utilize the air during the driving of the all-terrain vehicle 1000, such that the heat may be carried away by the fast flowing air, which may further improve the heat dissipation efficiency and ensure the working reliability of the components.

Thus, by the first air port 240 defined on the spacing region 24 between the main-seat region 25 and the auxiliary-seat region 26 of the backplate 21, the air may be supplied from the first air port 240 on the backplate 21 of the driver's cab 20 to the components at the rear side of the backplate 21 during the normal driving of the all-terrain vehicle 1000, so as to make full use of the available space on the backplate 21 without affecting the normal arrangement of other components, which not only increases the air volume at the rear side of the backplate 21, but also improves the space utilization.

As shown in FIG. 2, a cross-sectional area of an upper portion of the spacing region 24 decreases from up to down, and the first air port 240 decreases from up to down. Specifically, since user's arm needs to move on both sides of the main-seat region 25 and the auxiliary-seat region 26 when the user sits on the main-seat region 25 and the auxiliary-seat region 26, it may be understood that when the user's arm moves, moving range of the arm gradually increases in a direction away from shoulders. In order to prevent movement of the user's arm from covering the first air port 240 of the spacing region 24, a cross-sectional area of a side of the main-seat region 25 close to the spacing region 24 and a cross-sectional area of a side of the auxiliary-seat region 26 close to the spacing region 24 increase in a direction from up to down, such that the cross-sectional area of the upper portion of the spacing region 24 decreases in the direction from up to down, and the first air port 240 also decreases in the direction from up to down. In this way, movement area of the user's arm may always be located in the main-seat region 25 and the auxiliary-seat region 26 without covering front side area of the spacing region 24 and the first air port 240, which may further ensure the air volume of air supplied to the components at rear side of the backplate 21 through the first air port 240 of the spacing region 24. Moreover, shape of the spacing region 24 so arranged is fitted with shape of the first air port 240, so as to avoid that the arrangement of the first air port 240 has too much influence on the structure of the spacing region 24.

As shown in FIG. 2-FIG. 6, a front side of the container 30 is defined with a second air port 324 directly opposite to the second radiator 72. The first air port 240 is an air inlet and the second air port 324 is an air outlet. Specifically, through the front side of the container 30 defined with the second air port 324, the air in the accommodating slot 23 may be exchanged with the outside air through the second air port 324, which may ensure the fluidity of the air in the accommodating slot 23 and prevent the high-temperature air in the accommodating slot 23 from affecting the heat dissipation effect of the second radiator 72 in the accommodating slot 23. Further, through arrangement the second air port 324 directly opposite to the second radiator 72, the high-temperature air passing through the second radiator 72 may flow out of the second air port 324 directly, thereby improving the exchange efficiency between the air in the accommodating slot 23 and the outside air, and further improving the heat dissipation effect of the second radiator 72.

In addition, as shown in FIG. 2, the second air port 324 and the first air port 240 are directly opposite to the rear side and front side of the second radiator 72, respectively, to ventilate the front and rear of the accommodation tank 23, so as to further improve the exchange efficiency between the air in the accommodation tank 23 and the outside. Further, the first air port 240 is configured as a honeycomb air port or grid air port, such that on the premise of ensuring the ventilation performance of the first air port 240, relatively large foreign matters may be prevented from entering the accommodating slot 23 through the first air port 240 and damaging the second radiator 72, which may further ensure the structural reliability of the second radiator 72. Further, during the normal driving of the all-terrain vehicle 1000, the air around the all-terrain vehicle 1000 accelerates to flow backwards as a whole. Thus, the spacing region 24 of the backplate 21 is defined with the first air port 240, the outside air may accelerate to enter the accommodating slot 23 through the first air port 240, so as to accelerate the high-temperature air in the accommodating slot 23 to flow out from the second air port 324. Thus, circulation of the air inside and outside the accommodating slot 23 may be accelerated, and the heat dissipation efficiency of the second radiator 72 may be further improved.

Figure 4:
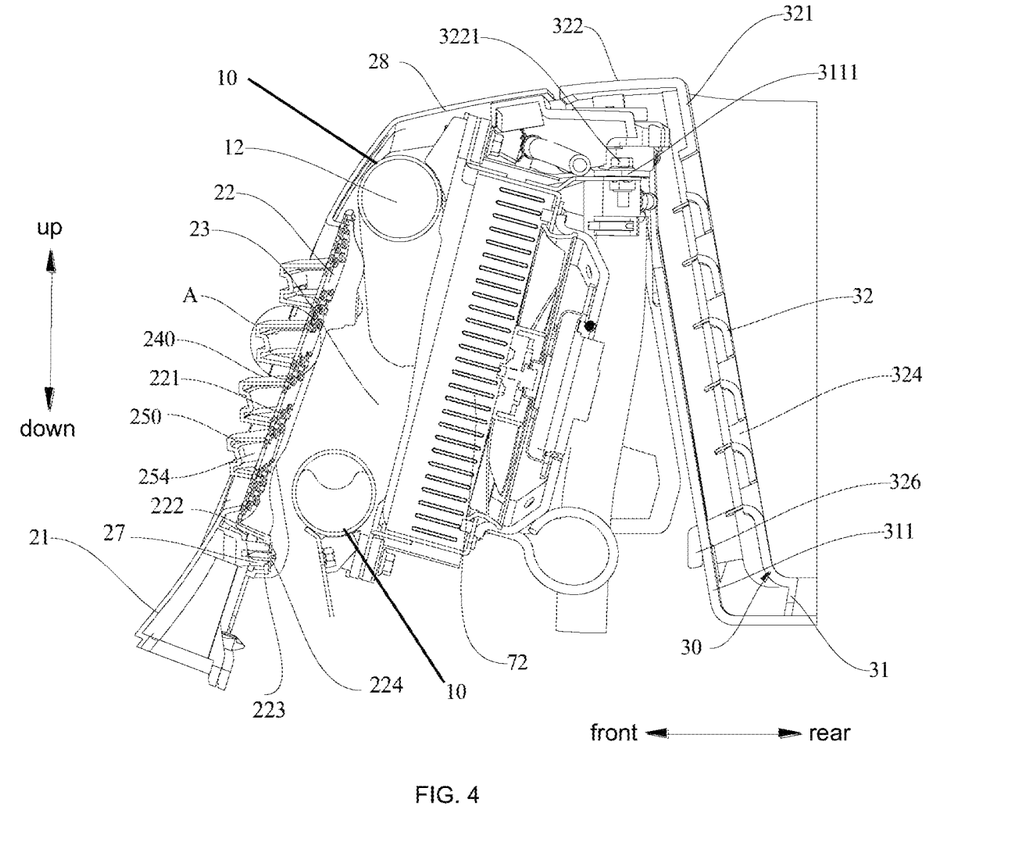
FIG. 4 is a partially sectional view in a first direction of an all-terrain vehicle according to an embodiment of the present disclosure.
Figure 5:
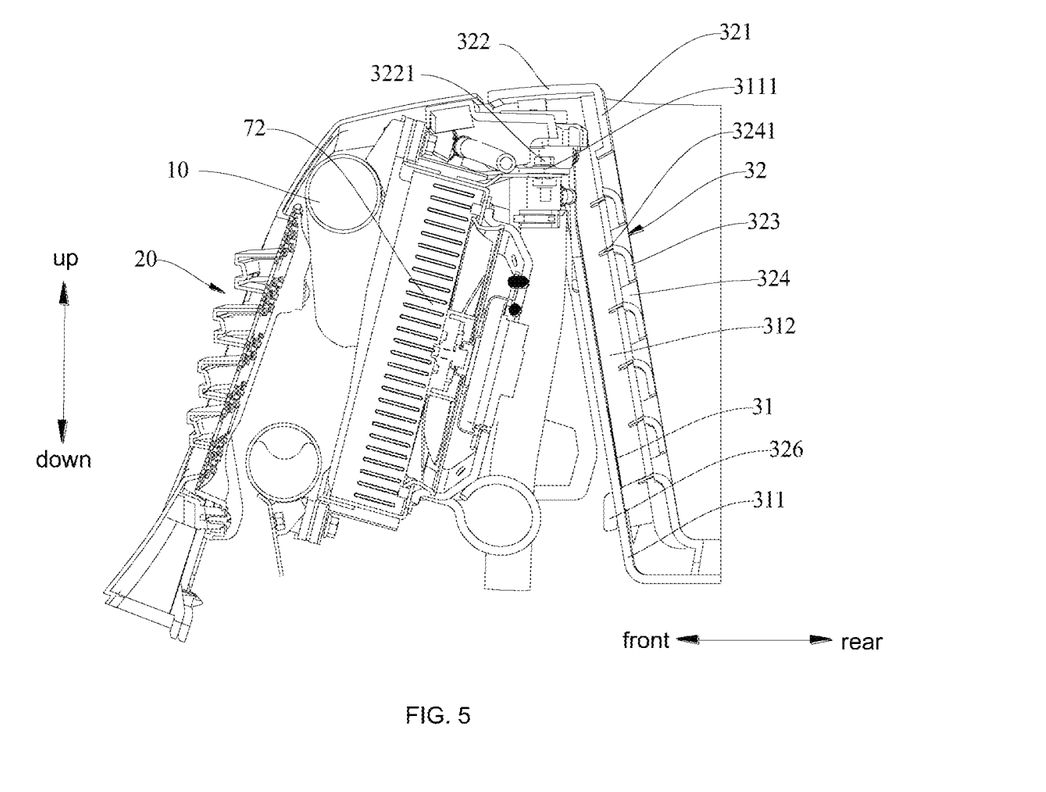
FIG. 5 is a partially sectional view in a first direction of an all-terrain vehicle according to an embodiment of the present disclosure.
Figure 6:
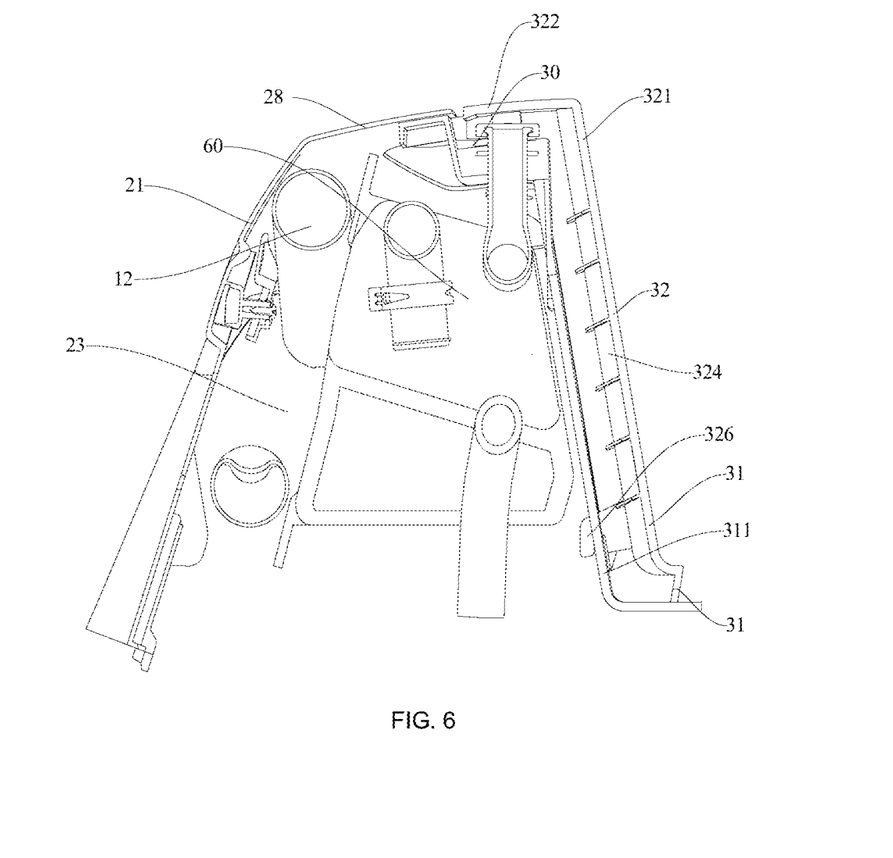
FIG. 6 is a partially sectional view in a second direction of an all-terrain vehicle according to an embodiment of the present disclosure.

As shown in FIGS. 4, 5 and 6, a first air guide strip 250 is arranged in the first air port 240, and two ends of the first air guide strip 250 are connected to the opposite sides of the first air port 240, respectively. The first air guide strip 250 may not only guide the air passing through the first air port 240, such that the air flows to the designated components at the rear side of the backplate 21, but also prevent the air from flowing to a wrong direction or spreading to other directions. Moreover, through guiding effect of the first air guide strip 250, a flow rate of the air passing through the first air port 240 may be further increased, which may increase the air volume of the air supplied to the components at the rear side of the backplate 21 in per unit time. In addition, the arrangement of the first air guide strip 250 may also strengthen the structural strength of the first air port 240 and avoid the structure of the first air port 240 being too fragile to be damaged.

Figure 7:
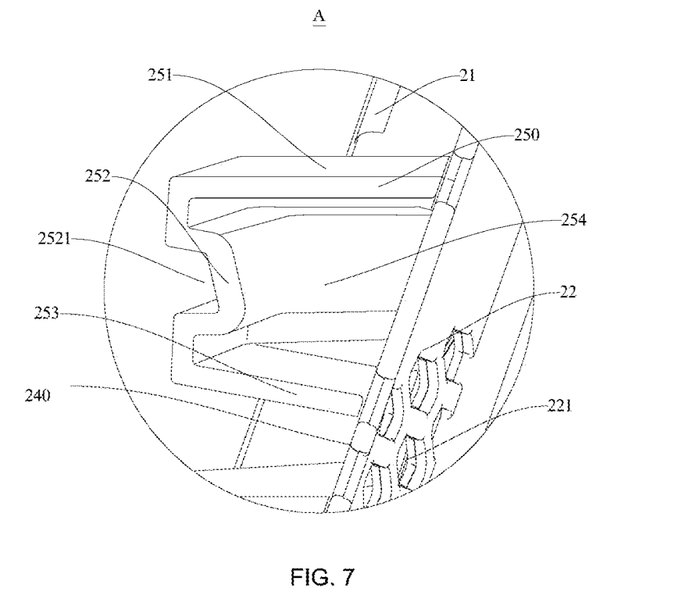
FIG. 7 is an enlarged view of portion A in FIG. 4.

As shown in FIG. 7, the first air guide strip 250 may mainly include a top plate portion 251, a front plate portion 252 and a bottom plate portion 253. The top plate portion 251 and the bottom plate portion 253 are spaced apart from each other in an up-down direction, the front plate portion 252 is connected between a front end of the top plate portion 251 and a front end of the bottom plate portion 253, and a cavity 254 is defined among the top plate portion 251, the front plate portion 252 and the bottom plate portion 253. Specifically, the top plate portion 251 and the bottom plate portion 253 protrude towards the front side of the first air port 240 and are spaced apart from each other, and the front plate portion 252 is connected in a spacing space at the front ends of the top plate portion 251 and the bottom plate portion 253. In this way, the first air guide strip 250 may protrude out of the first air port 240 as a whole, which may not only act as a reminder and prevent the user from covering the first air guide strip 250 in the case of not paying attention, but also increase a length of the first air guide strip 250 to guide the air and prevent the air from returning to the front side of the backplate 21, so as to improve the effect of the first air guide strip 250. Further, the cavity 254 among the top plate portion 251, the front plate portion 252 and the bottom plate portion 253 may reduce weight of the first air guide strip 250, such that not only may the first air guide strip 250 be more lightweight, but also the stability and firmness of the mounting of the first air guide strip 250 on the first air port 240 may be improved.

As shown in FIG. 2-5, the driver's cab 20 of the all-terrain vehicle 1000 may also mainly include: a filter screen 22 arranged at the first air port 240, and a plurality of vent holes 221 are spaced apart from each other and defined on the filter screen 22. Specifically, the filter screen 22 is arranged on a rear side of the first air port 240, such that the filter screen 22 may separate the components at the rear side of the backplate 21 from the front side of the backplate 21, so as to prevent the large foreign matters at the front side of the backplate 21 together with the air from passing through the first air port 240, which may otherwise hit and damage the component at the rear side of the backplate 21. In this way, the safety of the components at the rear side of the backplate 21 may be ensured, and the reliability of the first air port 240 may be further improved.

Further, the plurality of vent holes 221 are spaced apart from each other and defined on the filter screen 22, the ventilation of the first air port 240 may be improved on the premise of ensuring that the filter screen 22 separates the first air port 240 from the front side of the backplate 21, so as to prevent the filter screen 22 from blocking or slowing down the flow of air from the first air port 240 to the components at the rear side of the backplate 21. The filter screen 22 may be fully distributed with the vent holes 221, and that is, a part of the filter screen 22 corresponding to the first air guide strip 250 is also defined with the vent holes 221, such that the vent holes 221 may be evenly distributed on the filter screen 22, which may reduce the manufacturing difficulty of the filter screen 22. Optionally, the vent holes 221 may be partially distributed on the filter screen 22, and that is, a part of the filter screen 22 corresponding to the first air guide strip 250 is not defined with the vent holes 221, such that the vent holes 221 are only arranged in a ventilation gap between the corresponding first air guide strips 250, which may improve the structural strength of the filter screen 22.

As shown in FIGS. 2 and 4, a filter flange 222 is arranged at an edge of the filter screen 22. Specifically, the filter flange 222 is arranged towards the first air port 240 at the edge of the filter screen 22, so as to improve sealing between the edge of the filter screen 22 and the first air port 240, reduce air leakage from the edge of the filter screen 22 and the first air port 240 to a certain extent, and further improve the stability and firmness of the mounting of the filter screen 22 at the first air port 240.

As shown in FIGS. 2 and 4, the edge of the filter screen 22 is provided with a mounting foot 223 detachably mounted to the backplate 21. Specifically, the mounting foot 223 is mounted on the edge of the filter screen 22 and detachably mounted on the backplate 21, such that the filter screen 22 may be detachably and fixedly connected with the backplate 21, which may not only facilitate the mounting or removal of the filter screen 22, but also prevent the mounting foot 223 from covering the first air port 240 and affecting the ventilation of the first air port 240 since position of the mounting foot 223 is at the edge of the filter screen 22, thereby further ensuring the ventilation of the first air port 240.

As shown in FIG. 2 and FIG. 4, the backplate 21 is provided with a plurality of mounting seats 27 around an outer circumference of the first air port 240, the plurality of mounting seats 27 are configured to be fitted with fasteners 224, and there are a plurality of mounting feet 223 in one-to-one correspondence with the plurality of mounting seats 27. The fastener 224 passes through the mounting foot 223 to be fixedly connected with the mounting seat 27. Specifically, the mounting feet 223 are in one-to-one correspondence with the mounting seats 27, and the mounting holes are defined on the mounting feet 223 and the mounting seats 27, respectively, and the fastener 224 passes through the mounting hole such that the mounting foot 223 and the mounting seat 27 are fixedly connected through the fastener 224, so as to stably and fixedly mount the filter screen 22 on the backplate 21. In this way, the reliability of the filter screen 22 may be further improved. In addition, by evenly distributing the plurality of mounting feet 223 and the plurality of mounting seats 27 at circumferential edges of the filter screen 22 and the first air port 240 respectively, stress at connection joints between the mounting feet 223 and the mounting seats 27 may be more uniform, such that connection stability between the filter screen 22 and the first air port 240 may be further improved.

As shown in FIG. 1-FIG. 3, the frame 10 may mainly include: an underframe 11 and a supporting frame 12, the driver's cab 20 and the power unit 50 are arranged on the underframe 11, respectively, the supporting frame 12 is arranged above the underframe 11 and between the driver's cab 20 and the container 30, and the second radiator 72 is arranged on the supporting frame 12. Specifically, the supporting frame 12 is arranged above the underframe 11 and the second radiator 72 is mounted on the supporting frame 12, such that the stability and firmness of the mounting of the second radiator 72 is improved. Moreover, the spacing directions of the second air port 324, the second radiator 72 and the first air port 240 are parallel to a driving direction of the all-terrain vehicle 1000 all along, so as to further improve the heat dissipation efficiency of the second radiator 72.

As shown in FIG. 2 and FIG. 6, the all-terrain vehicle 1000 may also mainly include: a water jug 60 arranged on a side of the second radiator 72 and in communication with the second radiator 72. When a temperature of the second radiator 72 is higher than a set value, water in the water jug 60 may further cool the second radiator 72. In this way, the temperature of the second radiator 72 may be maintained within a relatively normal range, so as to ensure that the second radiator 72 may continuously and stably cool off the power unit 50, which may further improve the reliability of the second radiator 72.

As shown in FIG. 1, the power unit 50 is arranged directly below the container 30. The power unit 50 may mainly include: an engine and/or an electric motor, a temperature of the engine or electric motor rises when the engine or electric motor is working, and the second radiator 72 may be connected with the cooling channel of the power unit 50 to dissipate heat and cool off the engine or the electric motor, such that the engine or the electric motor may work normally, which prevent the engine or the electric motor from spontaneous combustion or damage due to excessive temperature of the engine or the electric motor. Thus, the reliability of the electric motor may be improved.

As shown in FIG. 7, a groove 2521 is defined on the front plate portion 252, and a length direction of the groove 2521 is the same as that of the front plate portion 252. When the air passes through the first air port 240 and hits the front plate portion 252, the groove 2521 on the front plate portion 252 may have a transitional buffer effect on the air, which may prevent the air from hitting the front plate portion 252 and causing noise at the first air port 240. Thus, air noise of all-terrain vehicle 1000 may be reduced. In addition, the arrangement of the groove 2521 may also effectively strengthen the structural strength of the front plate portion 252.

Further, as shown in FIG. 1-FIG. 6, the power unit 50 is arranged on the frame 10, a cooling channel 51 is defined within the power unit 50, and the first radiator 71 at a front side of frame 10 of the all-terrain vehicle 1000 is connected with the cooling channel. The first radiator 71 is arranged on the frame 10 and in front of the driver's cab 20, and the first radiator 71 is communicated with the cooling channel 51. The second radiator 72 is arranged on the frame 10 and is located behind the driver's cab 20, and the second radiator 72 is communicated with the cooling channel 51. Specifically, the power unit 50, the first radiator 71 and the second radiator 72 are all arranged on the frame 10, which may ensure the stability and firmness of the mounting of the power unit 50, the first radiator 71 and the second radiator 72 on the all-terrain vehicle 1000. In addition, the first radiator 71 and the second radiator 72 are arranged in front and rear of the driver's cab 20, respectively, and on the premise of ensuring the stability and firmness of the arrangement of the first radiator 71 and the second radiator 72, the first radiator 71 and the second radiator 72 may make full use of the available space on the all-terrain vehicle 1000 and improve the space utilization rate of the all-terrain vehicle 1000. Thus, the structure of the all-terrain vehicle 1000 may be more compact.

Figure 8:
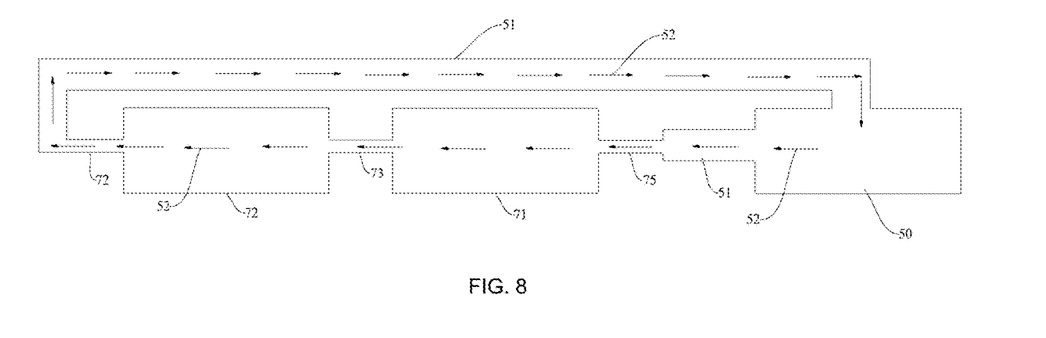
FIG. 8 is a schematic view of a cooling circulation circuit according to an embodiment of the present disclosure.

Further, as shown in FIG. 8, each of the first radiator 71 and the second radiator 72 is communicated with the cooling channel 51 of the power unit 50, and the cooling channel 51 is a two-way channel. When the power unit 50 drives the all-terrain vehicle 1000 to drive normally, the temperature in the power unit 50 rises, and the liquid medium 52 in the power unit 50 absorbs the heat of the power unit 50 to reduce the temperature of the power unit 50 and maintain the temperature of the power unit 50 within a reasonable range. The liquid medium 52 may enter the first radiator 71 and the second radiator 72 through the cooling channel 51, and the first radiator 71 and the second radiator 72 may exchange the heat in the liquid medium 52 with the surrounding air, such that the surrounding air may take away the heat in the liquid medium 52 to reduce the temperature of the liquid medium 52 and maintain the temperature of the liquid medium 52 within a reasonable range. The liquid medium 52 with normal temperature then enters the power unit 50 through the cooling channel 51 to dissipate heat and cool off the power unit 50, such that the first radiator 71 and the second radiator 72 may achieve the cooling circulation circuit to cool off the power unit 50.

In this way, the first radiator 71 and the second radiator 72 are both arranged on the all-terrain vehicle 1000, compared with the all-terrain vehicle with only the first radiator 71 on a front side of a vehicle body, when the power unit 50 works at high power, large amount of heat is generated by the power unit 50, when the heat dissipation effect of the first radiator 71 on the power unit 50 is insufficient, the second radiator 72 may be added to increase the heat dissipation effect of the power unit 50, so as to ensure that the power unit 50 may work continuously and stably, and then improve the reliability of the all-terrain vehicle 1000.

In addition, the first radiator 71 may be a main radiator and the second radiator 72 may be an auxiliary radiator. When power of the power unit 50 is normal and the heat dissipation effect of the first radiator 71 on the power unit 50 is sufficient, the second radiator 72 may be in a shutdown state. In this way, on the premise of ensuring that the temperature of the power unit 50 is within a reasonable range and the power unit 50 may work normally, unnecessary waste caused by the operation of the second radiator 72 may be avoided, which may not only prolong a service life of the second radiator 72, but also reduce energy consumption of the all-terrain vehicle 1000.

Of course, during the cold-start of the power unit 50, the liquid medium 52 in the cooling channel 51 may also quickly return to the cooling channel 51 without passing through the first radiator 71 and the second radiator 72. In this way, the temperature of the power unit 50 may rise rapidly and be within a reasonable range.

Thus, the first radiator 71 is arranged in front of the driver's cab 20, the second radiator 72 is arranged in rear of the driver's cab 20, and each of the first radiator 71 and the second radiator 72 is communicated with the cooling channel 51. In this way, a layout of the first radiator 71 and the second radiator 72 is more reasonable such that the structure of the all-terrain vehicle 1000 is more compact, and the heat dissipation effect of the all-terrain vehicle 1000 on the power unit 50 is further improved, so as to further improve the reliability of the all-terrain vehicle 1000.

Optionally, as shown in FIG. 8, the first radiator 71, the second radiator 72 and the cooling channel 51 are connected in series, such that a high-temperature liquid medium 52 in the power unit 50 may first enter the first radiator 71 from the cooling channel 51 for heat dissipation and cooling, and then enter the second radiator 72 for a secondary cooling. In this way, the heat dissipation and cooling effect of the first radiator 71 and the second radiator 72 on the liquid medium 52 may be better, such that the heat dissipation and cooling effect of the first radiator 71 and the second radiator 72 on the power unit 50 may be improved. It should be explained that when the heat dissipation effect of the first radiator 71 is sufficient and the second radiator 72 is in the shutdown state, the liquid medium 52 may still flow from the second radiator 72 instead of being blocked at the second radiator 72. However, at this time, the second radiator 72 does not dissipate heat the liquid medium 52. In addition, with such the arrangement, fewer pipelines are required, which may not only reduce the mounting cost, but also save the mounting space.

Optionally, the first radiator 71 and the second radiator 72 are connected in parallel and each of the first radiator 71 and the second radiator 72 is connected in series with the cooling channel 51, such that the liquid medium 52 in the power unit 50 may enter the first radiator 71 and the second radiator 72 simultaneously from the cooling channel 51, so as to increase a flow rate of the liquid medium 52 entering the first radiator 71 and the second radiator 72 in per unit time, which may also improve the heat dissipation and cooling effect of the first radiator 71 and the second radiator 72 on the power unit 50.

Further, the first radiator 71, the second radiator 72 and the cooling channel 51 may be selectively arranged in series according to the different power of different all-terrain vehicles 1000, the different structure of different all-terrain vehicles 1000 and the specific process requirements, or after connected in parallel, the first radiator 71 and the second radiator 72 may be arranged in series with the cooling channel 51. In this way, the first radiator 71 and the second radiator 72 may be mounted and applied to different all-terrain vehicles 1000, and the applicability of the first radiator 71 and the second radiator 72 may be improved.

As shown in FIG. 1-FIG. 6, the power unit 50 is closer to the second radiator 72 than the first radiator 71, a first pipeline 73 is connected between a water outlet of the first radiator 71 and a water inlet of the second radiator 72, and a second pipeline 74 is connected between a water outlet of the second radiator 72 and a water inlet of the cooling channel 51, and a third pipeline 75 is connected between a water outlet of the cooling channel 51 and a water inlet of the first radiator 71. Specifically, the liquid medium 52 in the power unit 50 may flow from the water outlet of the cooling channel 51 to the third pipeline 75 connected with the cooling channel 51, and from the third pipeline 75 to the water inlet of the first radiator 71. After the first radiator 71 dissipates and cools off the liquid medium 52, the liquid medium 52 may flow out of the water outlet of the first radiator 71 and enter the first pipeline 73, then enters the water inlet of the second radiator 72 through the first pipeline 73, and afterwards flows into the second radiator 72 from the water inlet of the second radiator 72. After the liquid medium 52 is subjected to a secondary heat dissipation of the second radiator 72 and the temperature of the liquid medium 52 is reduced to a reasonable range by heat dissipation, the liquid medium 52 may flow into the second pipeline 74 from the water outlet of the second radiator 72, then flow back into the cooling channel 51 through the second pipeline 74, afterwards flow back into the power unit 50 from the cooling channel 51, and then recycle, such that the cooling circulation circuit of the first radiator 71 and the second radiator 72 to the power unit 50 may be formed.

Thus, not only the reliability of the first radiator 71 and the second radiator 72 for the cooling circulation of the power unit 50 may be ensured, but also the pipelines through which the liquid medium 52 passes are simple and direct, so as to improve speed of the cooling circulation, and prevent the liquid medium 52 from stagnation and jamming in the pipelines. In addition, the cooling circulation circuit may also be provided with a water pump to supply power for the circulation of the liquid medium 52, and the water pump may be connected with the power unit 50 in a transmission manner, that is, the power unit 50 may drive the water pump simultaneously during working, so as to ensure that the liquid medium 52 may participate in the heat exchange when the power unit 50 starts to work.

The first radiator 71 is provided with a first fan, and the second radiator 72 is provided with a second fan. The all-terrain vehicle 1000 further includes a controller electrically connected with the first fan and the second fan, respectively, so as to control working states of the first fan and the second fan. Specifically, the first fan and the second fan may accelerate the flow rate of air around the first radiator 71 and the second radiator 72 respectively, so as to increase the heat exchange rate between the air around the first radiator 71 as well as the second radiator 72 and the liquid medium 52 in the first radiator 71 as well as the second radiator 72. Thus, the air around the first radiator 71 and the second radiator 72 may take away the heat in the liquid medium 52 much faster, such that the heat dissipation efficiency of the first radiator 71 and the second radiator 72 may be improved.

Further, the working states of the first fan and the second fan are accurately controlled by the controller. When power of the power unit 50 is normal and the heat dissipation effect of the first radiator 71 on the power unit 50 is sufficient, the controller may control the first fan to work continuously and control the second fan to stop working, so as to ensure that the temperature of the power unit 50 is within a reasonable region. On the premise that the power unit 50 may work normally, unnecessary waste caused by the rotation of the second fan may be avoided, which may not only prolong a service life of the second fan, but also reduce energy consumption of the all-terrain vehicle 1000.

The first radiator 71 has a first heat dissipation surface, an area of the first heat dissipation surface is S1, the second radiator 72 has a second heat dissipation surface, and an area of the second heat dissipation surface is S2. S1 and S2 satisfy relationship: $0.45 \leq S2 \leq S1$. Specifically, the second heat dissipation surface of the second radiator 72 is arranged to be smaller than the first heat dissipation surface of the first radiator 71, the unnecessary waste caused by the excessive area of the second heat dissipation surface may be avoided on the premise of ensuring the heat dissipation performance of the second radiator 72. Further, the second heat dissipation surface may be set within a suitable range to prevent the second heat dissipation surface from being too small, which causes a poor heat dissipation effect of the second radiator 72 on the power unit 50. In this way, the application effect of the first radiator 71 and the second radiator 72 on the all-terrain vehicle 1000 may be improved.

In addition, the first radiator 71 is arranged at the front side of the frame 10 of the all-terrain vehicle 10000, and is connected with the cooling channel of the engine or electric motor. The first radiator 71 and the second radiator 72 between the driver's cab 20 and the container 30 may dissipate the heat of the engine or electric motor together, which may further improve the cooling speed of the power unit 50, so as to further improve the reliability of the all-terrain vehicle 1000.

In the description of the present disclosure, it should be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are only for convenience of description and do not indicate or imply that the device or element referred to must have a particular orientation, or be constructed and operated in a particular orientation. Thus, these terms shall not be construed as limitation on the present disclosure.

Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the exemplary descriptions of the above terms throughout this specification are not necessarily referring to the same embodiment or example.

Although embodiments of the present disclosure have been shown and described, it would be appreciated by those skilled in the art that various changes, modifications, alternatives and variations may be made in the embodiments without departing from principles and purposes of the present disclosure. The scope of the present disclosure is defined by the claims and their equivalents.

What is claimed is:

1. An all-terrain vehicle, comprising:
   a frame;
   a driver's cab arranged on the frame and located in a middle portion of the frame;
   a container arranged on the frame and located behind the driver's cab;
   a power unit arranged on the frame;
   a radiator arranged behind the driver's cab, the container being defined with an air port corresponding to the radiator.

2. The all-terrain vehicle according to claim 1, wherein the container comprises: a container body and a front cover plate; a front side of the container body is defined with a through hole, the front cover plate is mounted at the through hole and defined with the air port.

3. The all-terrain vehicle according to claim 2, wherein the front cover plate is provided with a third flange at an edge of the air port.

4. The all-terrain vehicle according to claim 2, wherein a front side wall of the container body is provided with a first hanging portion, the front cover plate is provided with a second hanging portion, one of the first hanging portion and the second hanging portion is a hook, and the other one of the first hanging portion and the second hanging portion is a hanging hole, and the hook is fitted with the hanging hole in a hanging manner.

5. The all-terrain vehicle according to claim 4, wherein the front cover plate comprises: a cover body and a second flange, the second flange is connected to a top of the cover body, the second flange is arranged on a top of the front side wall of the container body, the front side wall of the container body is provided with a first positioning portion, and the second flange is provided with a second positioning portion, one of the first positioning portion and the second positioning portion is a positioning column, the other one of the first positioning portion and the second positioning portion is a positioning hole, the positioning column is positioned and fitted with the positioning hole.

6. The all-terrain vehicle according to claim 2, wherein the container body is provided with a step portion recessed at an edge of the through hole, an edge of the front cover plate is overlapped at the step portion, and a surface of the front cover plate does not exceed a surface of the front side wall of the container body.

7. The all-terrain vehicle according to claim 1, wherein the radiator is located at a front side of the container, and a leeward surface of the radiator is opposite to the air port; or the radiator is arranged in the container.

8. An all-terrain vehicle comprising:
a frame;
a driver's cab arranged on the frame;
a power unit arranged on the frame, a cooling channel being defined in the power unit, the power unit comprising an engine, an air inlet pipeline and an air filter, the air inlet pipeline being connected between the engine and the air filter;
a container arranged on the frame and located behind the driver's cab;
a radiator located between the container and the driver's cab and communicated with the cooling channel.

9. The all-terrain vehicle according to claim 8, wherein the driver's cab comprises a backplate connected to a front side of the container, an accommodating slot is defined between the backplate and the container, and the radiator is arranged in the accommodating slot.

10. The all-terrain vehicle according to claim 9, wherein a top of the backplate is provided with a first flange, the first flange is overlapped on the front side of the container and detachably connected to the container.

11. The all-terrain vehicle according to claim 8, wherein the driver's cab comprises a backplate located at a front side of the radiator, the backplate is defined with a first air port directly opposite to the radiator.

12. The all-terrain vehicle according to claim 11, wherein the backplate is provided with a main-seat region, a spacing region and an auxiliary-seat region in a transverse direction of the all-terrain vehicle, and the first air port is located in the spacing region.

13. The all-terrain vehicle according to claim 11, wherein a front side of the container is defined with a second air port directly opposite to the radiator, the first air port is an air inlet and the second air port is an air outlet.

14. The all-terrain vehicle according to claim 11, wherein a first air guide strip is arranged in the first air port, and two ends of the first air guide strip are connected to opposite sides of the first air port, respectively; the first air guide strip comprises a top plate portion, a front plate portion and a bottom plate portion, the top plate portion and the bottom plate portion are spaced apart from each other, the front plate portion is connected between a front end of the top plate portion and a front end of the bottom plate portion, and a cavity is defined among the top plate portion, the front plate portion and the bottom plate portion.

15. The all-terrain vehicle according to claim 14, wherein a groove is defined on the front plate portion, and a length direction of the groove is the same as a length direction of the front plate portion.

16. The all-terrain vehicle according to claim 14, wherein the driver's cab comprises: a filter screen, an edge of the filter screen is provided with a mounting foot detachably mounted to the backplate; the backplate is provided with a plurality of mounting seats around an outer circumference of the first air port, the plurality of mounting seats are configured to be fitted with fasteners, and there are a plurality of mounting feet in one-to-one correspondence with the plurality of mounting seats, the fastener passes through the mounting foot to be fixedly connected with the mounting seat.

17. An all-terrain vehicle comprising:
a frame;
a driver's cab arranged on the frame;
a power unit arranged on the frame, a cooling channel being defined in the power unit;
a first radiator arranged on the frame and located in front of the driver's cab, and communicated with the cooling channel;
a second radiator arranged on the frame and located behind the driver's cab, and communicated with the cooling channel;
wherein the first radiator, the second radiator and the cooling channel are connected in series; or
the first radiator and the second radiator are connected in parallel, and each of the first radiator and the second radiator is connected in series with the cooling channel;
wherein the power unit is closer to the second radiator than the first radiator, a first pipeline is connected between a water outlet of the first radiator and a water inlet of the second radiator, and a second pipeline is connected between a water outlet of the second radiator and a water inlet of the cooling channel, and a third pipeline is connected between a water outlet of the cooling channel and a water inlet of the first radiator.

18. The all-terrain vehicle according to claim 17, wherein the first radiator has a first heat dissipation surface, an area of the first heat dissipation surface is S1, the second radiator has a second heat dissipation surface, and an area of the second heat dissipation surface is S2, wherein S1 and S2 satisfy relationship: $0.4S1 \leq S2 \leq S1$.

* * * * *